UNITED STATES PATENT OFFICE.

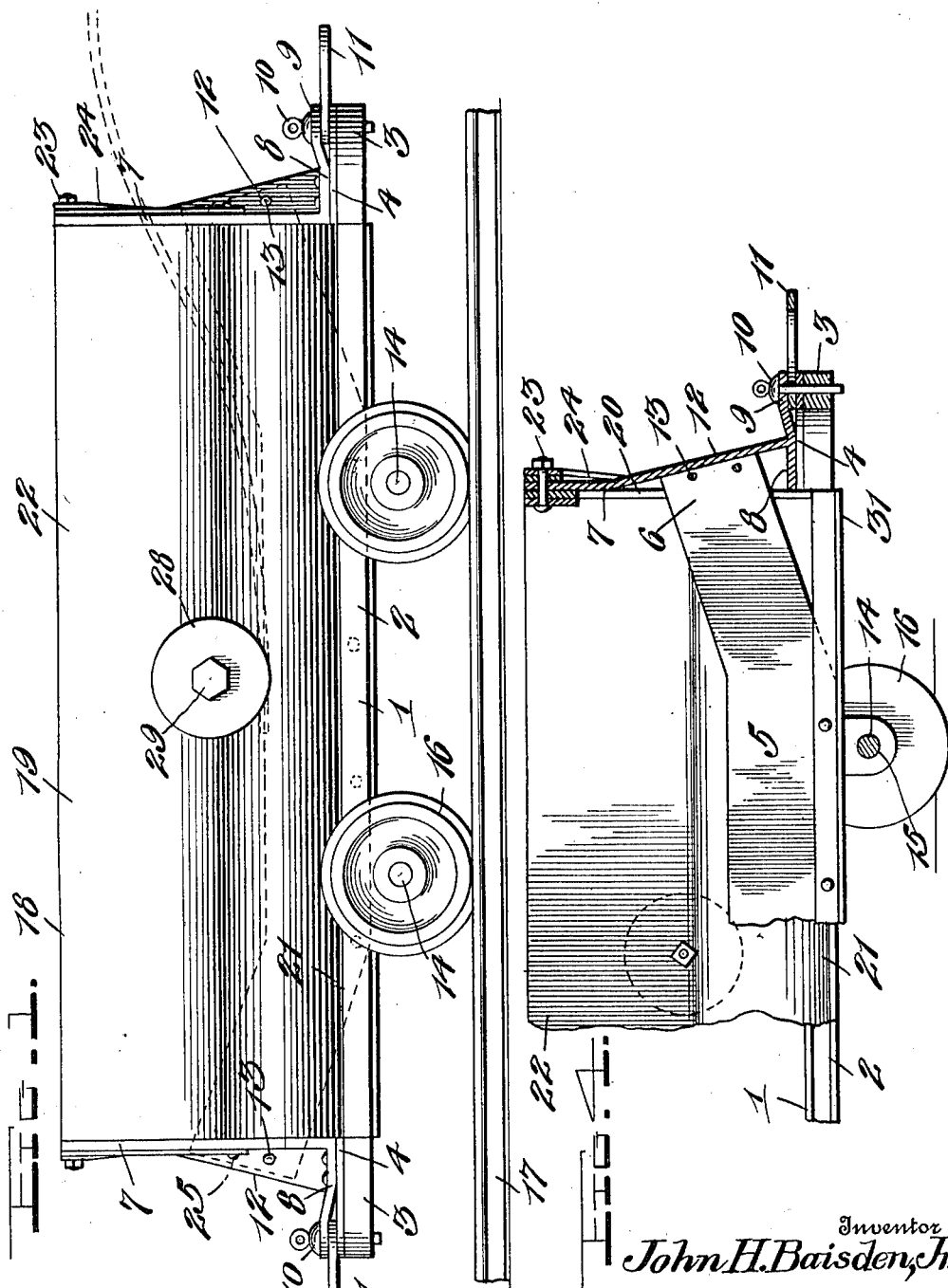

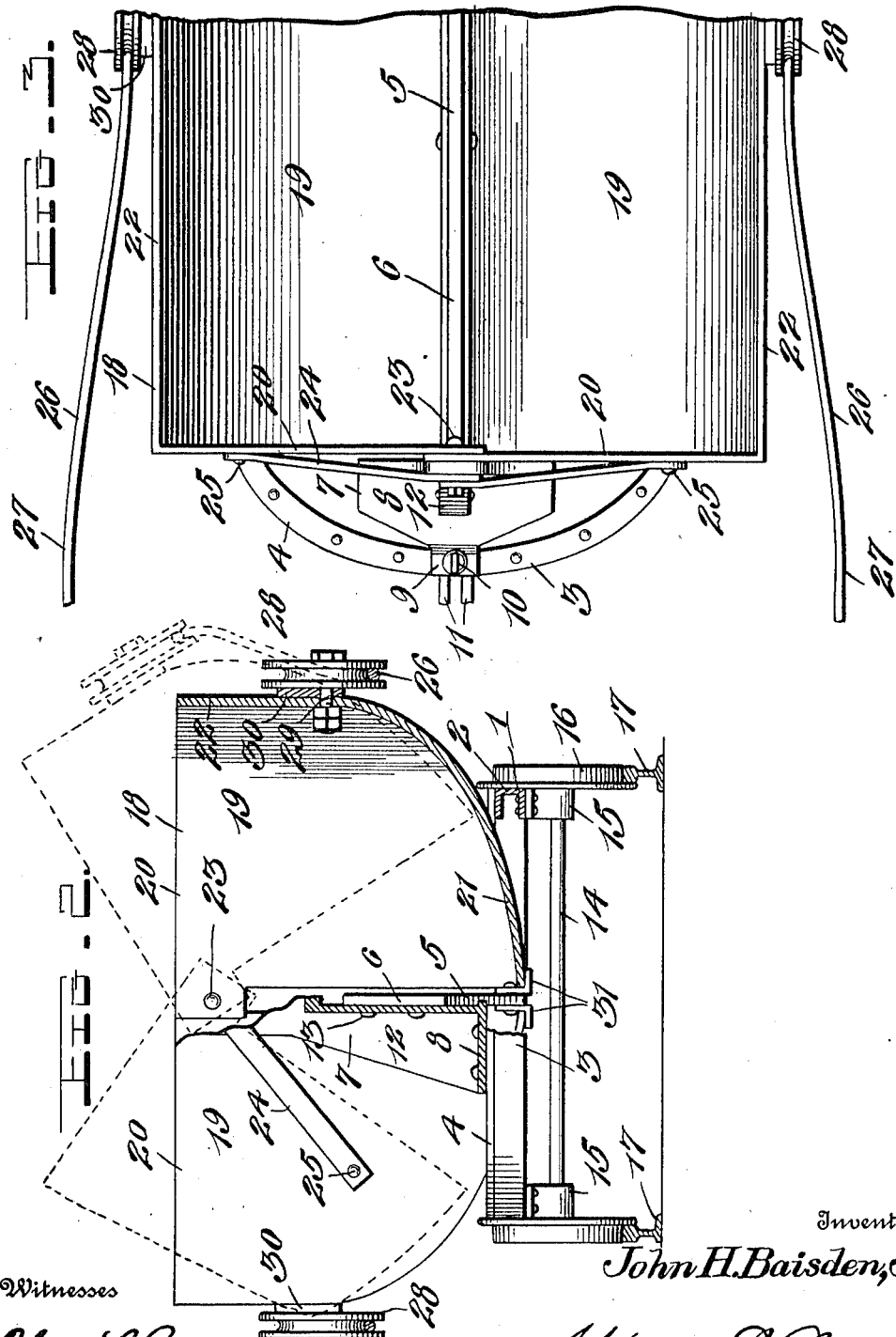

JOHN HENRY BAISDEN, JR., OF DOTT, WEST VIRGINIA.

DUMPING-CAR.

1,001,334.	Specification of Letters Patent.	Patented Aug. 22, 1911.

Application filed January 30, 1911. Serial No. 605,497.

*To all whom it may concern:*

Be it known that I, JOHN HENRY BAISDEN, Jr., a citizen of the United States, residing at Dott, in the county of Mercer and State of West Virginia, have invented certain new and useful Improvements in Dumping-Cars, of which the following is a specification, reference being had to the accompanying drawings.

This invention relates to improvements in dumping cars, and means for operating the same, and consists in the construction, combination and arrangement of devices hereinafter described and claimed.

One object of my invention is to provide an improved dumping car especially adapted for use as a coal car, but also adapted for use as a dump car for carrying any commodity, which it is desired to expeditiously dump or unload from the car, a further object of the invention being to combine with the dumping car, means for automatically operating the same to dump the contents thereof when the car arrives at the pit or point where it is desired that its load may be discharged.

In the accompanying drawings—Figure 1 is a side elevation of a dumping car constructed in accordance with my invention, a portion of one of the dumping rails being indicated in dotted lines and the brace plate being also indicated in dotted lines. Fig. 2 is partly an elevation and partly a transverse sectional view of the same showing the sides of the car in closed position, in full lines and in opened dumping position in dotted lines. Fig. 3 is a plan of a portion of the car, also showing the dumping rails. Fig. 4 is a detail central vertical sectional view of one end of the car.

The frame 1 of my improved car comprises a pair of longitudinal channel beams 2 and a pair of semicircular bumper beams 3 which connect the ends of the said beams 2 together, and form the bumper ends of the car. Semi-circular plates 4 are riveted on the upper sides of the bumper beams and coact therewith, to form platforms at the ends of the car. A medially disposed brace plate 5 extends nearly from end to end of the car, lies in a vertical plane, and has its ends upturned as at 6. At the ends of the car are standards 7 each of which is formed with a base 8 which bears on and is riveted to one of the plates 4, and is provided with a coupling arm 9 which is spaced above the plate, and has an opening which alines with a similar opening in the plate, and in the bumper bar to receive a coupling pin 10 for engagement with a coupling link 11 of usual form so that any number of the cars may be coupled and uncoupled as may be desired. Each standard 7 has on its outer side, a medially disposed brace web 12 which is hollow. The ends of the brace plate 5 pass through openings in the standards 7 and enter the recesses formed in the brace webs, and are secured to the said brace webs by means of bolts 13. The axles 14 are mounted in bearings 15, which are bolted to the under sides of the channel beams 2, the axles being provided with the usual flanged wheels 16, which operate on track rails 17. The body 18 of the car comprises a pair of sections 19, each of which has substantially segmental end walls 20, a curved bottom 21, and an outer wall 22 the said segments of the body being open on their opposing inner sides, and being also open on their upper sides. The segments of the car body are pivotally mounted between the standards 7, pivot bolts 23 being here shown which pass through overlapping portions of the walls 20, of the said body sections, and also through the said standards so that the body sections are thus mounted for angular movement in a vertical plane, and may be raised and lowered. When lowered the body sections close against opposite sides of the brace plate 5, so that the said brace plate forms a partial partition or wall between the said body sections. When raised the bottoms of the body sections move outwardly from the brace plate, and discharge the contents of the body by gravity through the openings formed between the brace plate and the side bars 2 of the frame of the car, as will be understood, so that the entire contents of the car may be almost instantly discharged by merely raising the outer sides of the body sections. The body sections are provided on their ends with straps or link bars 24 which are pivoted on the pivot bolts 23, and the lower outer ends of which are pivotally connected to the ends of the sections of the car body as at 25. These straps or link bars strengthen the ends of the body sections and also strengthen the pivotal connections between the body sections and the standards 7.

I will now describe means for automatically raising the sections or members of the car body so as to discharge the load therefrom. On opposite sides of the track, at the point where it is desired to unload the car, are a pair of dumping rails 26 which are mounted on suitable supports and which are longitudinally curved and extend above the plane of the track rails. The said dumping rails are also curved laterally as shown at 27 on a suitable radius. Each member of the body of the car is provided on its outer side with an unloading wheel or roller 28 which forms a tappet element, and is here shown as mounted on a stub shaft 29 formed by a bolt, which bolt also engages a bracket plate 30 which is secured to the outer side wall of the car body section or member. The unloading wheels 28 are disposed at such an elevation, that when the car reaches the dumping rails, the said unloading wheels engage one end of the dumping rails, and run upwardly thereon, thereby raising the members of the car body and causing the load therein to be discharged through the opposing openings in the frame 1, formed between the beams 2 of the said frame, and the brace plate 5. As the unloading wheels pass over the highest central point of the dumping rails, and run down on the said dumping rails, they permit the members of the car body to reassume their normal lowered position. The same effect can be produced if desired, by backing the car, after its unloading wheels have reached the highest point on the dumping rails. Longitudinally disposed bars 31 are secured to opposite sides of the brace plate 5, near the lower edge thereof, and are provided with outstanding flanges as shown in Figs. 2 and 4, which flanges are engaged by the bottoms of the body sections at the inner upper sides thereof when the said body sections are closed so that the inner portions of the bottoms of the body sections are supported and held by the said flanged bars.

From the foregoing it will be understood that by appropriately locating the dumping rails, each car of a train will be automatically unloaded as the same passes the said dumping rails, and by the forward motion of the car.

I claim:—

1. A dumping car comprising a frame, standards on the frame near the ends thereof and each provided with a medially disposed brace web on its outer side, said brace web being hollow on its inner side, a longitudinally disposed brace plate arranged in a vertical plane and having its ends upturned and disposed in the hollows of the said standard webs and secured to the said standards, a body comprising a pair of members each having a closed outer side and bottom and an open inner side, the said members of the car body being pivotally mounted on the said standards for angular movement in a vertical plane so that when the members are raised an opening is formed between them and so that when they are lowered their open sides close together and against opposite sides of the said brace plate.

2. A car of the class described comprising a frame, standards on the frame near the ends thereof, a longitudinally disposed brace plate connecting the said standards, angle bars on opposite sides of the brace plate and a body comprising a pair of members pivotally mounted between the standards, each member of the car body having a closed bottom and a closed outer wall and being open on its inner side, said body members, when lowered, closing against opposite sides of the brace plate and on the said angle bars.

In testimony whereof I hereunto affix my signature in the presence of two witnesses.

JNO. HENRY BAISDEN, Jr.

Witnesses:
J. F. BROWN,
W. O. BILLINGS.